(12) United States Patent
Zavesky et al.

(10) Patent No.: US 12,010,406 B2
(45) Date of Patent: *Jun. 11, 2024

(54) SYSTEM FOR SUMMARY SEGMENT ASSOCIATION AND DYNAMIC SELECTION FOR VIEWING WITH A CONTENT ITEM OF INTEREST

(71) Applicant: AT&T Intellectual Property I, L.P., Atlanta, GA (US)

(72) Inventors: Eric Zavesky, Austin, TX (US); Taylor Gift, Austin, TX (US); James H. Pratt, Round Rock, TX (US); Barkha Pathik Patel, Austin, TX (US); Michael Gonzales, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,290

(22) Filed: Jul. 5, 2022

(65) Prior Publication Data

US 2022/0345797 A1 Oct. 27, 2022

Related U.S. Application Data

(63) Continuation of application No. 17/100,030, filed on Nov. 20, 2020, now Pat. No. 11,412,314.

(51) Int. Cl.
| | |
|---|---|
| *H04N 21/8549* | (2011.01) |
| *G06V 20/40* | (2022.01) |
| *H04N 21/44* | (2011.01) |
| *H04N 21/442* | (2011.01) |
| *H04N 21/45* | (2011.01) |
| *H04N 21/81* | (2011.01) |

(52) U.S. Cl.
CPC ... *H04N 21/8549* (2013.01); *H04N 21/44008* (2013.01); *H04N 21/44204* (2013.01); *H04N 21/4532* (2013.01); *H04N 21/8133* (2013.01); *G06V 20/47* (2022.01)

(58) Field of Classification Search
CPC ......... H04N 21/8549; H04N 21/44008; H04N 21/44204; H04N 21/4532; H04N 21/8133; G06V 20/47
See application file for complete search history.

(56) References Cited

U.S. PATENT DOCUMENTS

| | | |
|---|---|---|
| 2009/0297045 A1 | 12/2009 | Poetker et al. |
| 2015/0170455 A1 | 6/2015 | Rad et al. |
| 2016/0210664 A1 | 7/2016 | Biswas et al. |
| 2019/0320216 A1 | 10/2019 | Liu et al. |
| 2020/0304881 A1 | 9/2020 | Kawakami et al. |
| 2022/0167068 A1 | 5/2022 | Zavesky et al. |

*Primary Examiner* — Adil Ocak
(74) *Attorney, Agent, or Firm* — Guntin & Gust, PLC; Atanu Das

(57) ABSTRACT

Aspects of the subject disclosure may include, for example, receiving information about a content item of interest to a content consumer, determining a context of the content consumer, curating a summary segment for the content consumer based on the context of the content consumer, and presenting the summary segment to the content consumer at a context-appropriate time and in a context-appropriate manner to orient the content consumer to the content item of interest at a current viewing time of the content consumer. Other embodiments are disclosed.

20 Claims, 8 Drawing Sheets

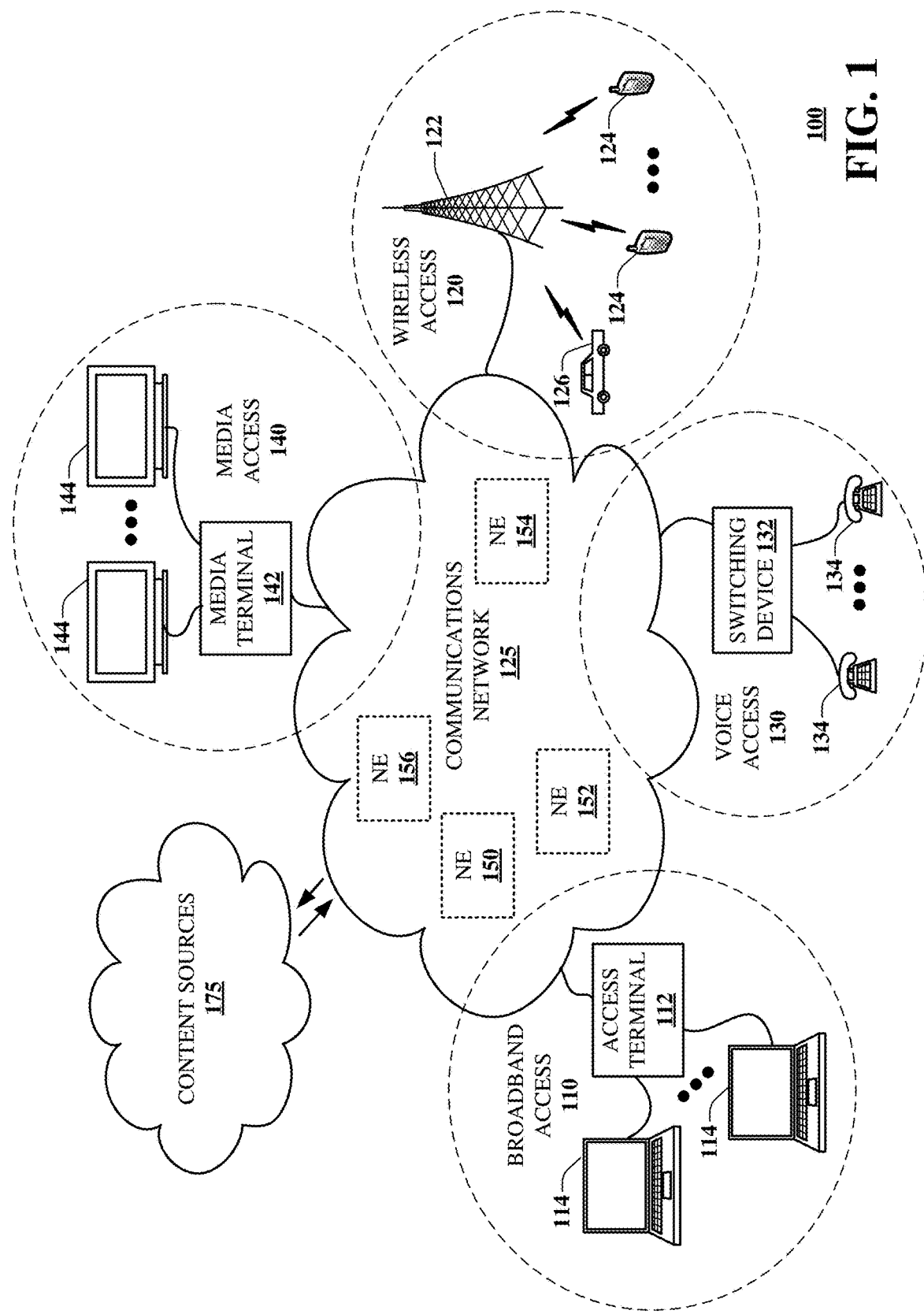

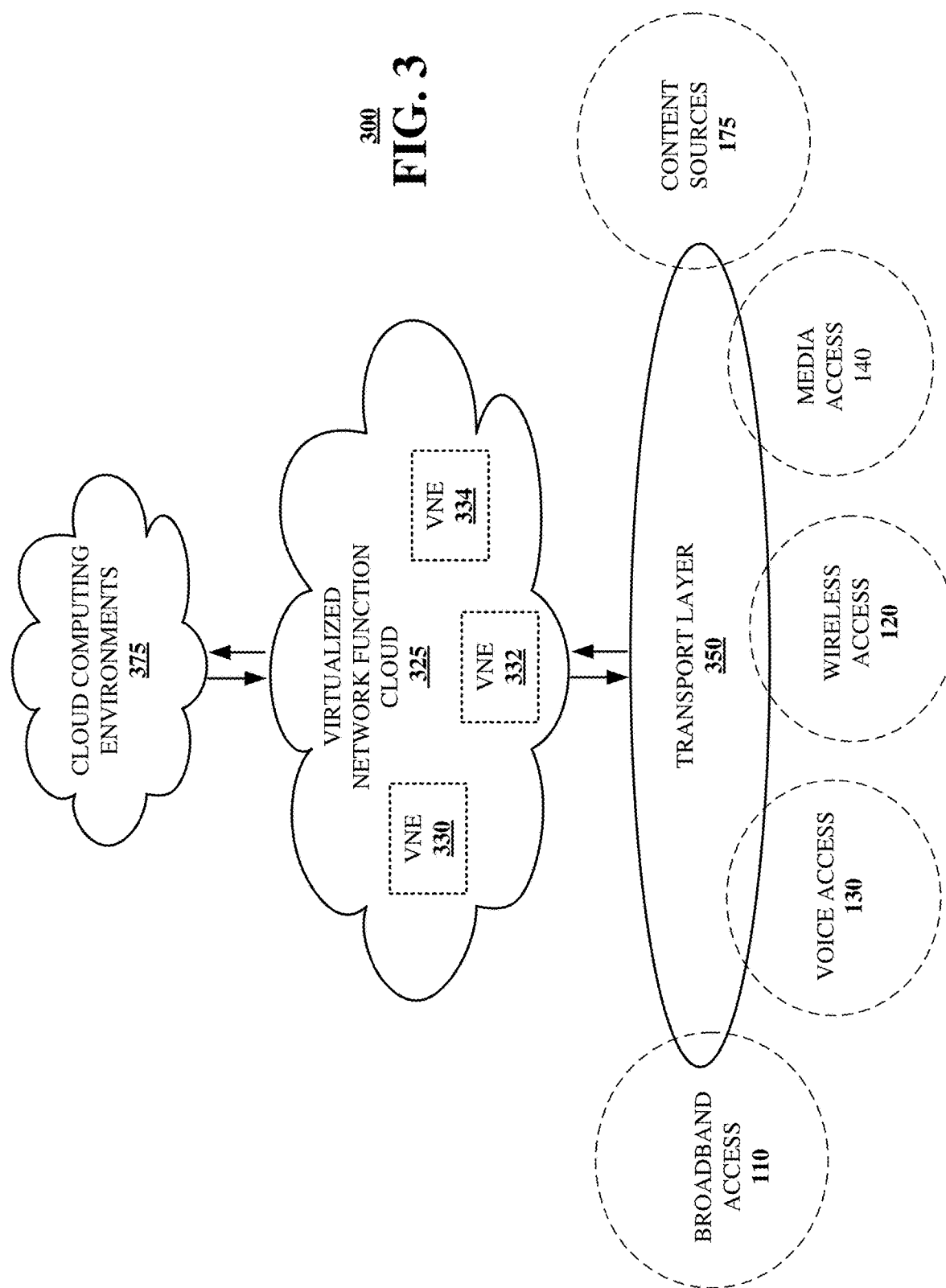

SYSTEM FOR SUMMARY SEGMENT ASSOCIATION AND DYNAMIC SELECTION FOR VIEWING WITH A CONTENT ITEM OF INTEREST

CROSS REFERENCE TO RELATED APPLICATIONS

This application is a continuation of U.S. patent application Ser. No. 17/100,030 filed on Nov. 20, 2020. All sections of the aforementioned application are incorporated herein by reference in their entirety.

FIELD OF THE DISCLOSURE

The subject disclosure relates to providing summary segments of audio, video and other content items to content consumers according to context of the content consumers.

BACKGROUND

Some video programs include a "last seen" segment positioned at the beginning at the beginning of the program to recapitulate or provide a summary for the viewer past events in the plot that may be pertinent to the current episode.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
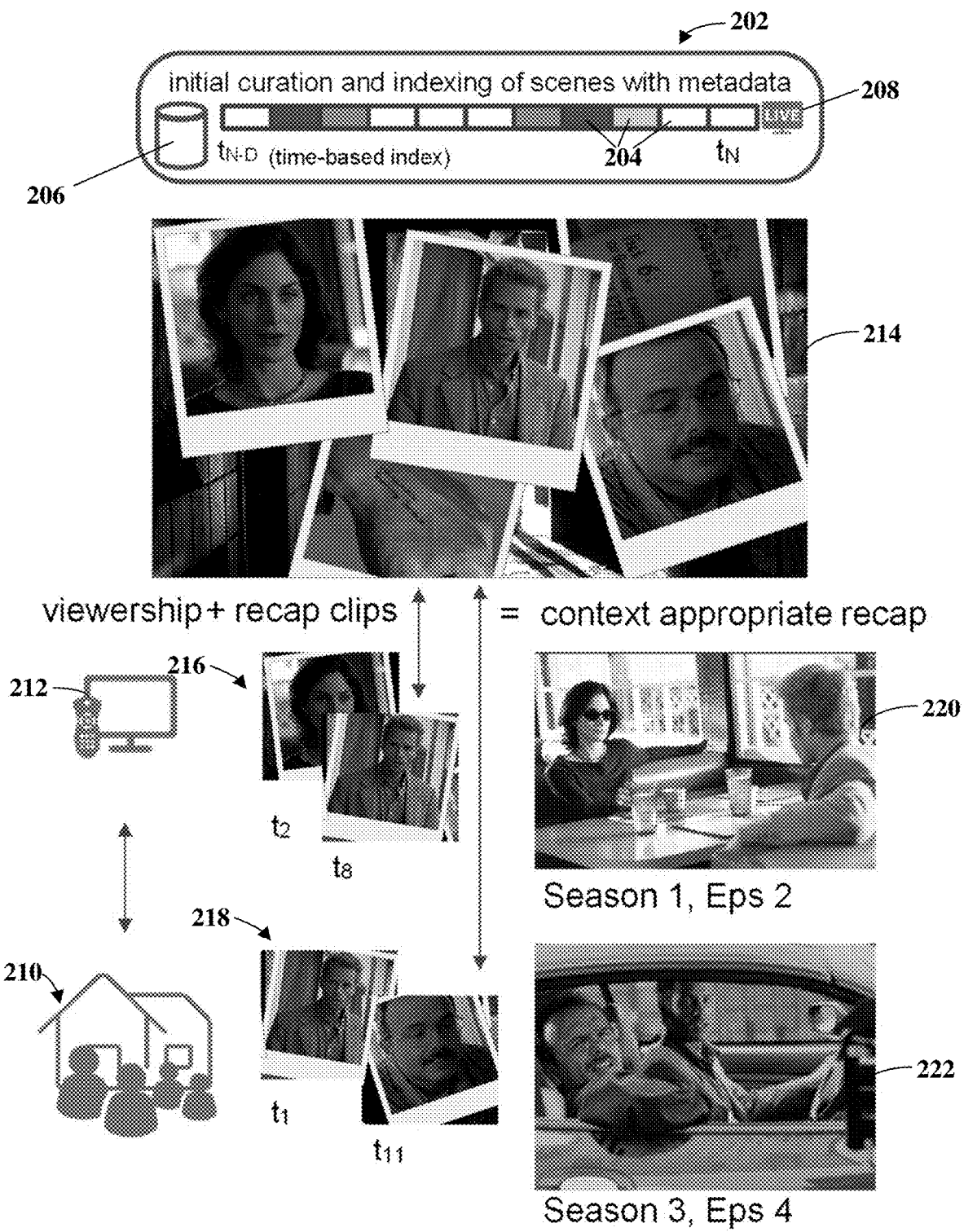
FIG. 2A is a block diagram illustrating an example, non-limiting embodiment of a system functioning within the communication network of FIG. 1 in accordance with various aspects described herein.

The subject disclosure describes, among other things, illustrative embodiments for providing summary segments of audio, video, imaging, messaging, gaming, immersive, and other content items to content consumers according to the context of the content consumers, such as content consumption habits or historical content consumption. Other embodiments are described in the subject disclosure.

One or more aspects of the subject disclosure include receiving information about a content item of interest to a content consumer, analyzing information about the content item of interest, identifying features of the content item of interest for playback to the content consumer, forming identified features of interest and receiving information about consumption of the content item of interest by the content consumer. The subject disclosure may further include preparing a summary segment for the content item of interest, including selecting particular features from the identified features of interest based on the information about consumption of the content item of interest by the content consumer and organizing the particular features to form the summary segment, determining a current context of the content consumer, and providing the summary segment to the content consumer according to the current context of the consumer.

One or more aspects of the subject disclosure include receiving information about a content item of interest to a content consumer, determining a context of the content consumer, curating a summary segment for the content consumer based on the context of the content consumer, and presenting the summary segment to the content consumer at a context-appropriate time and in a context-appropriate manner to orient the content consumer to the content item of interest at a current viewing time of the content consumer.

One or more aspects of the subject disclosure include receiving a content item of interest to a content consumer, analyzing the content item of interest to identify key aspects of the content item of interest and determining consumption of the content item of interest by the content consumer, including determining a context of content consumption. The subject disclosure may further include selecting one or more portions of the content item of interest for a summary segment to reorient the content consumer, wherein the selecting one or more portions of the content item of interest is based on the key aspects of the content item of interest, the consumption of the content item of interest by the content consumer and the context of content consumption. The subject disclosure may further include presenting the summary segment to the content consumer, receiving, from the content consumer, a request for additional summary segments for the content item of interest, formatting the additional summary segments according to the request, and presenting the additional summary segments to the content consumer.

Referring now to FIG. 1, a block diagram is shown illustrating an example, non-limiting embodiment of a system 100 in accordance with various aspects described herein. For example, system 100 can facilitate in whole or in part providing a content item to a content consumer, such as over a communication network to the content consumer. The system 100 can determine context information for the content consumer and curate a summary segment for the content consumer to orient or reorient the content consumer to the content item. The content item may be, for example, a video content item, an audio content item, a gaming content item or an immersive content item. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system functioning within the communication network of FIG. 1 in accordance with various aspects described herein. FIG. 2A illustrates how one or more content items such as content item 202 is segmented into a sequences of scenes or segments 204. The content item 202 may be any content item that may be presented to a user, including video items such as movies and television programs, audio items such as songs or sound recordings or podcasts, or other media such as video games. Content items including the content item 202 may be stored in data storage 206 and presented in live at a presentation time 208. Each of the content items including the content item 202 may be stored in conjunction with metadata related to the content item. The metadata may have any suitable format and content, such as additional video or audio or textual information, geographical or biographical information, etc. The segments 204 each may be defined by or correspond to a time-wise index. In the example of FIG. 2A, the most-recent segment has an index $t_N$ and the initial segment has an index $t_{N-D}$.

Further in FIG. 2A, one or more viewers 210 may consume the content item 202 at a location on user equipment 212. The user equipment 212 may be any suitable equipment for viewing the content item 202, such as a home television for viewing a television program or film, a mobile device or portable device such as a tablet computer for viewing a television program or film or a song or sound recording or podcast. The content item 202 may be delivered to the viewers in any suitable fashion, such as over one or more digital networks including the internet, over broadcast television, over broadcast satellite, and other technologies not currently in use. The content item in this example is part of a television program that is presented over time in a series of episodes, with a set number of episodes per season. This organization is exemplary and any organizing or structure may be used.

The content item 202 may be a content item of interest to one or more viewers such as viewers 210. A content item of interest is one that the viewers 210 select or choose to consume. A content item of interest may include, for example, a film, and a content item of interest may include other content items such as advertisements. The other content items may actually serve as interruptions to the content item of interest and may serve as distractions or otherwise interfere with engagement by the viewers 210 with the content item of interest. In an example, the content item 202 is organized into a series 214 of clips or segments, each having a respective length or duration and corresponding to a time index. In the example of FIG. 2A, the content item 202 includes a video and the series 214 of segments include portions of the video showing characters and storyline of the video.

To assist the viewers 210 to understand relationships among characters and storyline, two or more segments of the series 214 of segments may be combined into a summary segment to provide additional information about the content item 202 to the viewers. For example, the viewers 210 may be shown a summary segment 216 including a female character in a segment with time index $t_2$ and a first male character in a segment with time index $t_8$. The summary segment 216 provides context for a scene 220 of the television program that actually occurred in season 1, episode 2 of the television program. Further, the viewers may be shown a summary segment 218 including the first male character in a segment with time index $t_1$ and a second male character in a segment with time index $t_{11}$. The summary segment 218 provides context for a scene 222 of the television program that actually occurred in season 3, episode 4 of the television program. The summary segment may include a recap segment that recapitulates some or all of prior content such as plot points, character development, etc.

By providing summary segments, a system and method in accordance with aspects described herein assist the viewers 210 in understanding aspects of a content item such as content item 202. Thus, in the example, the viewers 210 can see that the same first male character appeared at time index $t_1$ and time index $t_8$, both in a scene with the female character and in a separate scene with the second male character. This may be done automatically by facial recognition or other technology to relate the characters, the scenes and the storyline. The metadata stored with the content item may be used for this purpose. Further, as described herein, the system and method may determine a context of the viewers 210, curate a summary segment appropriate to that context, and present the summary segment to the viewers 210 at a context-appropriate time and in a context appropriate manner. Thus, the summary segment may explain to the viewers 210 why the characters in scene 220 of the television program are together in a restaurant or why the characters in scene 222 are in a car together. The context-appropriate summary segment orients the viewers, or tells the viewers what they need to know, based on their current knowledge, about the characters, the location and the plot, to understand each scene 220 and scene 222. If the viewers have experience with the content item 202, such as having already seen some or all of the content item 202, the summary segment operates to reorient the viewers 210. This can include informing them of plot points they may have not seen, or informing them about characters they may have not yet met or other aspects of the content item they may have forgotten. After being oriented to a new content item, or reoriented to a familiar content item, the viewers 210 are in a position to consume the content item with little confusion or uncertainty. If they are oriented or reoriented, they are up to speed with the content item.

As indicated by FIG. 2A, in many cases production and delivery of content has moved to a model of multiple episodes, multiple seasons and multiple sessions. Such content may include video content such as films and television programs, audio content including podcasts and audio books or journals, and other media as well, such as video games. Producers have learned that there is a market for episodes that are a sequel or a prequel to an existing, successful episodes. For fictional works, such sequel and prequel episodes tell additional stories about characters in the original episodes, develop additional characters and advance the plot in different directions over time. An example is the Star Wars film series in which the first-released film, from 1977, is considered episode four in the series and later-released films (in time) portray earlier events or later events in the timeline of the story. For non-fictional works, such episodes allow further investigation or development of a topic over time, as audience interest grows or as addition facts and material become known. For a non-fictional work, such new episodes might be cast as "how did we get to this point?" or "where do we go from here?"

Such multiple-season, multiple-session content enables development of entertainment franchises of content items. Such franchises can have longevity which spans multiple actors, like the James Bond series of films. Such franchises can have longevity which spans multiple decades, such as the Star Wars films. Such franchises can produce sub-franchises, such as the DC Comics universe of films and the Marvel universe of films.

Writers and producers of such content items may deliberately introduce features and characters that appear in multiple scenes within an episode and can extend across multiple episodes. Such features may form effective cross-links between episodes, across time and space, or even among different franchises. These cross-links allow events or characters to be brought back to mind in the viewer or listener when they appear on screen or otherwise become part of the story. At other times, the cross-links develop organically over time as additional episodes are created with internal references back to previously released episodes.

For audiences, following such development of characters and plots over time (as new episodes are released) can greatly enhance enjoyment of a franchise. Fans can see the development of characters that are beloved or loathed and plot lines can either be advanced or extinguished over time. This can create additional or extended content, such as social media discussions and ancillary coverage. Introductory content is published However, as available libraries of content for a single enterprise grow, the number or quantity of multi-episode, multi-season or multiple-session content items may become difficult for viewers to navigate to find material of interest. This can be especially true because of the time-inconsistent way in which some of these franchises are developed, with prequel episodes and sequel episodes being released without respect to their actual relation to the timeline of the story. Moreover, for new viewers approaching an existing or long-standing enterprise, finding a way into the story can be daunting. Again, an entertainment franchise can present numerous plot threads and characters, and the connections among these may not be at all evident.

Thus, some technique for collecting, preparing and organizing summary segments is needed. Such summary segments may include portions of audio, video, text and other information that may be viewed as an aid to the viewer. These may be viewed as a way to come up to speed on the story and the characters. These may be viewed as a way to fill in gaps in the viewer's understanding or awareness of the story. These may be viewed as introductory content for viewers who want to better understand the story, plot, characters and actors of a fictional franchise. There is a similar need for content such as video games, where the story line is not necessarily linear or causal but rather responds, for example, to inputs and activities of gamers participating in the game. There is a similar need for non-fictional content as well, such as a documentary that is part of a series, and a viewer may wish to explore earlier or subsequently released episodes. Summary segments can assist such viewers.

Conventionally, summary segments have been prepared manually by human curators. Such summary segments typically are placed at the beginning of an episode and introduced with a voice-over statement such as, "Previously seen," following by brief segments from one or more previously-released episodes that stitch together pieces of the plot and character development. However, such conventional summary segments are static and unchanging and are the same for all viewers. This may be because the original content was not annotated to explain or indicate plot and character details. This may be because content items may be produced by different producers. The carry-over between different episodes or sessions may be quite low, making a clear presentation of a summary segment difficult. Another conventional summary that may be available is crowd-sourced in nature, with individuals voluntarily compiling segments, perhaps with commentary, and making them available online. Again, such conventional recapping is manual in nature, not automated.

Further, such conventional summary segments do not take into account a respective viewer's personal, individualized experience with episodes, the overall entertainment franchise or with adjacent material such as social media. Moreover, such conventional summary segments do not take into account user behavior such as a user being distracted while watching an episode, or a user only being partly engaged with the plot or characters. The same summary segment is available and presented to all viewers without regard to such user behavior or individual user understanding of the existing content. Recall and consumption of content in a summary segment is limited to a single, often linear playback form without using more interactive, mobile and multi-screen options and technology.

In accordance with various aspects herein, summary segments are developed and presented automatically for individual viewers based at least in part on the context of the viewers. This is done automatically be recovering or discovering linkages in plot and character by content analysis using tools such as facial recognition, place identification, synchronization across episodes, etc. The system and method may automatically recognize a character or a location or other linkable feature within the content and draw connections between them for selection and presentation to a viewer in a summary segment. In some examples, existing, manually curated summary segments may be used as either a basis for an automatically generated summary segment, such as a seed to inform what is happening, or as a source to expand around to add a deeper level of recall or informing for the viewer.

Further, in addition to presenting a summary segment at a beginning portion of an episode, in some embodiments, a summary segment may be developed and presented at a time and with content that is most appropriate to assist the viewer, given the viewer's current context. For example, if a new character is being introduced in an episode, or an old character is being revived, content presentation of the episode may be interrupted to present a summary segment detailing the background and history and other aspects of that character. This may be prepared automatically by a system that has awareness of the viewer's history with the entertainment franchise and episodes of the entertainment franchise. For example, if the viewer has no awareness of a reintroduced character, the system may prepare a more in-depth summary segment to better apprise the viewer of the character's history. If the viewer has more awareness of the reintroduced character, the system will prepare a less-detailed summary segment, taking into account episodes the system knows the viewer has missed or only watched with distraction. Further, the system can provide a relatively short-term summary, such as over a last episode or last few episodes, or a longer-term summary over several seasons or chapters. Thus, the summary can be tailored to the viewer's awareness and experience with the content. In this example, the viewer's context includes familiarity with past details of plot and character, even down to particular episodes and incidents that may be important to the current viewing. Tailoring the summary segment in this manner can result in heightened awareness and enjoyment for the viewer.

In some embodiments, presentation of a summary segment may be interactive for the viewer. In an example, prior to interrupting presentation of a content item, the viewer may be prompted with an on-screen or audible prompt to view or hear the summary segment. Presentation of the summary segment may proceed only if approved by the viewer and options such as replay, rewind and fast forward may be provided.

In another example, the viewer may be presented with a richer menu of items to select from. In an embodiment, content may be re-sequenced to facilitate presentation of the summary segment. For example, upon the appearance of a character, a menu may be presented giving the viewer options to view greater details, including more or fewer replays of past content, about the character. In another example, user interaction with the menu item may cause the system to link back to one or more previous episodes to view the previous episodes.

User interaction may be in any convenient and meaningful manner, depending on the viewer's context. The user may be presented with a thumb-up, thumb-down option or swipe-left, swipe-right interface, or a touch sensitive or mousing option to double-click or tap-and-expand the options that are presented on screen. In this example, a portion of the viewer's context for such user interaction is the viewing apparatus used by the viewer, such as a mobile device with a touch-sensitive screen or a home television display controlled by a remote control.

In another aspect, some embodiments may provide a mechanism for specific attention detection, playback and linkage. This provides an additional means to determine the user's current context. A viewer or listener may consume content on any suitable content consumption device including a home television system, a laptop or desktop computer or a mobile device such as a cellular telephone. In some applications, the content consumption device may include or be associated with one or more sensors or other behavioral monitors to collect information about the viewer or listener as the content is consumed. For example, the room where a home television system is located, or the device itself, may be equipped with such sensors and behavioral monitors. The environment of the viewer is part of the viewer's context. The system and method in accordance with some embodiments may detect and collect user behavior during content consumption. Examples of user behavior include watching a display screen attentively, turning away from the screen and getting involved with a telephone call while the content displays on the mobile phone. The user's degree of engagement with the content, during past viewing and currently, is thus also part of the viewer's context.

In this manner, viewership attention can be detected and attributed for the viewer and the content item or a segment of the content item. Such viewership attention may be stored for subsequent use. Later, when the viewer is watching further content, part of the context of providing a summary segment includes the information about the user's attention level during previous viewing. As an example, as a subsequent episode of a television program is viewed by a viewer, the system and method may retrieve from storage information that the viewer was distracted during presentation of a key portion of the plot or storyline during an earlier episode. To enhance the viewer's enjoyment, the system and method may suspend playback and give the viewer options to replay some or all of the key portion of the plot or storyline.

Sensors may further be used to judge the appropriateness of such an interruption, and further provide additional context of the viewer. If the viewer of the subsequent segment has a facial expression that conveys confusion or dismay, which may be used by the system to confirm that a summary segment should be offered to help the viewer. The system may use stored information about the user's attention level to predict the viewer's ability to recall, during viewing of the subsequent episode, the previous content. The prediction may be used as part of the context for showing a summary segment, for example to provide a deeper or shallower summary of the previous content consumed.

Thus, the system and method operates to determine the context of the viewer and the viewer's experience with the content when providing the summary segment. This ensures that the summary segment is meaningful to the user from a variety of perspectives, including an attention perspective, from an emotional perspective and from an engagement perspective. The summary segment is contextually linked to the viewer's experience with the content, including viewership habits and what the viewer has seen and has not seen, or not seen with significant attention.

In another example of use of context, a viewer catch-up operation may be available for a viewer who has missed past segments or episodes of content but needs an update. For example, if a viewer plans to watch a current episode but lacks the awareness and knowledge of particular key characters in the current episode, or of key plot points leading to the current episode, the system and method may select portions of past content to provide to the user prior to viewing the current episode. In this case, the context includes the viewer's knowledge of past content episodes and current and future viewing plans for current content episodes.

In another example, user context may refer to the context of a group. For example, if a group of viewers are together watching a film that is one episode of a multi-episode franchise of films, viewer experience with the individual episodes may vary. The viewers of the group may be physically located together, in the same room or space. Or the viewers of the group may be watching together virtually, over one or more networks, seeing the same film or episode. The virtual viewing scenario may include, for example, the ability to share comments about the shared group experience. Some viewers may have seen all episodes. Some viewers may have seen none or one episode. Some viewers may have seen various episodes. In an embodiment, the system and method are able to determine that the group of viewers are consuming content, or that a content consumer is joined by other viewers in the same space or virtually over a network. The system and method are further aware of respective users' history with the film franchise and its episodes and it selects content segments to form a summary segment that may apply to all audience members. The system and method will select or filter aspects of the content to inform the group, as a group. In an embodiment the system is able to detect who is present among the viewers and retrieves a profile for each respective user. The profile includes information about what content the respective user has viewed, locations of viewing, viewing habits, etc. The system will adjust the summary segment present according to respective viewers' profiles. This may be done, for example, to prevent disclosing spoilers that are present in the current episode that may ruin viewing of a previous episode for a view who has not seen the previous episode. This may also be done to expand content presented from previous episodes for a viewer who did see the previous episodes and may be lacking awareness of the previous episode.

In another example, embodiments of the system and method may determine a risk of loss of viewer attention in a complex environment, and may adjust the content of the summary segment accordingly. A viewing environment can vary from, for example, viewing alone in a quiet home environment to viewing in a busy commuting environment on a mobile device, with frequent possible interruptions. This aspect of the context of the viewing environment may be sensed by the system and used to adjust the content of a summary segment. For example, if the system detects the viewer has been distracted for a time duration, the system may select a summary segment including the last important plot development or information segment, and related material, and provide the summary segment to the viewer at a less-distracted context.

In another example, user context may refer to the context of gaming including online gaming. The gaming environment includes features such as screen realm and story arc. Some gaming environments include extended reality (XR) and augmented reality (AR) and other technology that may incorporate, for example, XR headsets and multiple in-room screens to create an immersive experience for the gamer. The system and method in some embodiments can provide summary segments to assist with the immersive feeling of gaming and story elements in gaming. For example, in an e-sports environment, a gamer may need to leave mid-game. Upon rejoining the game, the system and method may provide a summary segment that shows exciting points of the game. The system detects the exciting moments, in some examples using sensors to detect the user's response to the gaming action. The system recreates an experience to replay the exciting moments.

In some embodiments, a system and method may make available to the viewer related content. For example, some programs, films or other content items of interest have available ancillary or auxiliary content that may supplement or explain the content item of interest. As an example, a film may have available a podcast discussing aspects of the film, or a television program may have available an online interview with the show-runner of the television program discussing aspects of the television program, or a video content item may have supplemental material in extended reality (XR), augmented reality (AR) or video game format. Such ancillary or auxiliary content may be in the same format, such as video, audio or combinations, or may be in alternative formats. For example, if the content item of interest is a video content item, the system and method may include auxiliary content which has a different format from the content item of interest, such as an audio content item or a textual content item, for inclusion in the summary segment. During viewing of the content item of interest, the system or method may make available to the viewer such ancillary or auxiliary items. These ancillary or auxiliary content items may be within the same asset family, such as earlier episodes or earlier films forming prequel episodes or sequel episodes. Alternatively, these ancillary or auxiliary content items may include another set of audio, video, textual or other assets that provide context to the content item of interest and information beyond the original scope of the content item of interest. The ancillary or auxiliary content may further accommodate different media, such as podcasts, etc., and different presentations, such as, for example, pop-up video or notifications. Such additional content may make for a richer experience and a repurposing of the effort that went into making the content.

In some embodiments, a system and method may make available to the viewer related content in the form of commentary or analysis of a content item of interest. For example, online blog posts may be collected about the content item of interest and the viewer may be prompted with an option to view such related content. Depending on context, such as the device the viewer is using to view the content item of interest, the related content may be offered on another device of the user. For example, if the user is watching a film on a home television, the system and method may make available to a second screen, such as a nearby tablet computer or mobile phone, the related content providing fan commentary on the film as the film is being viewed.

Figure 2B:
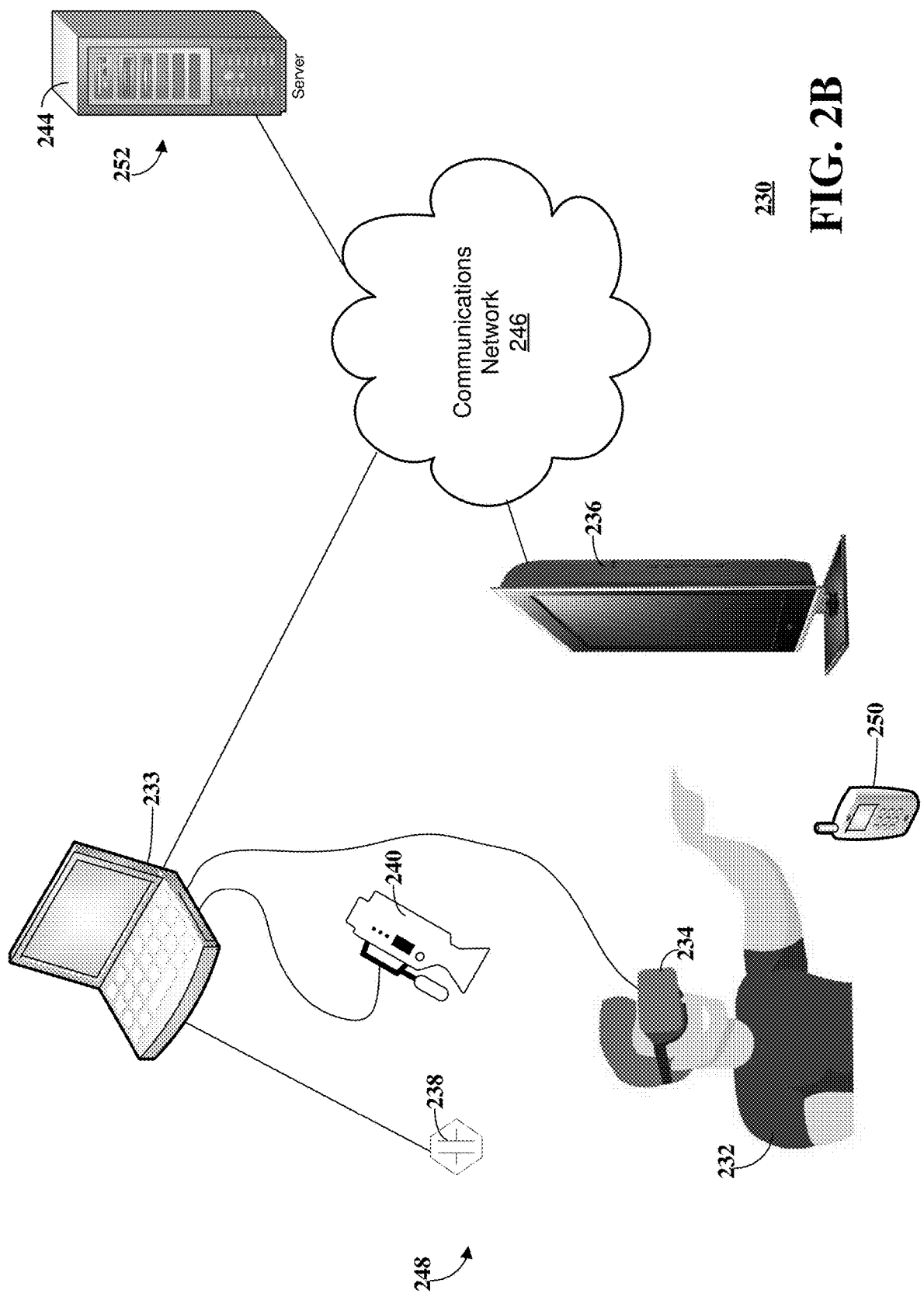
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 230 functioning within the communication network of FIG. 1 in accordance with various aspects described herein. The system 230 enables presentation of summary segments of content for viewing by a user 232 of a video, audio or other content item. The user 232 may interact with the content item and the summary segments using various equipment and techniques.

The system 230 in this embodiment includes an optional extended reality (XR) headset 234 wearable by the user 232, a display system 236, one or more sensors 238, one or more cameras 240, a user computer 242, and a server 244 accessible over a communications network 246 and a mobile device 250. The user 232, the XR headset 234, the display system 236 and the mobile device 250 are generally located together in an environment 248. The environment 248 may include other people and any other objects.

The display system 236 may be a fixed display screen such as a computer monitor, television, projection screen, a ubiquitous wall display, an in-seat or in-dash holographic display, or a series of display screens in the physical environment 248 with the user 232. The display system 236 may include a display screen, a set-top box, a connected theater projector, a server or other processing system. The display system 236 may further include audio components for audio playback and audio recording. Such audio components may include one or more speakers and one or more microphones. The display system 236 may include a communications interface for data communications such as over the communications network 246. Further, the display system 236 may communicate directly with the XR headset 234, the user computer 233 or any combination of these. Such communications may be performed wirelessly or over wireline connections, or by any combination.

In some embodiments, the XR headset 234 may be operated in conjunction with the display system 236. The XR headset 234 enables the user 232 to experience, generally, an XR environment, where XR is a general term intended to encompass XR, VR and augmented reality (AR) systems, equipment and environments. The XR headset 234 generally includes a data processing system including one or more processors, a memory for storing data and instructions, and a communication interface. The XR headset 234 provides visual display to the user 232 and may include one or more display screens within the XR headset 234 to control the view seen by the user 232 and the environment experienced by the user 232. The XR headset 234 generally provides to the user a panoramic view around the user's head. Further, the XR headset 234 may include a camera for capturing images of the environment of the user 232. The XR headset 234 may include speakers to provide sound information to the user 232 and the XR headset 234 may include one or more microphones to collect sound information about the environment of the user 232. In other embodiments, the XR headset 234 may be embodied as AR glasses or other wearable devices.

The display system 236 may be adapted to present to the user 232 one or more content items. Such content items may include video content items including television programs, films and other content. Such content items may include audio content items such as songs, podcasts and other content. Such content items may include video games, including video and audio components of a video game. The display system 236 may be operated alone or in conjunction with the XR headset 234 to provide an immersive experience for the user 232.

The content items presented to the user 232 may include one or more summary segments as accordance with various aspects described herein. The one or more summary segments may include audio, video, text, an immersive experience or any other suitable information to provide to the user 232 a summary of content to inform and orient the user 232 about a content item previously presented or to be presented to the user 232.

The sensors 238 may include any sort of condition sensing and data collection apparatus suitable for the embodiment of the system 230. The sensors 238 may include environmental sensors that collect information such as temperature, wind speed, orientation or acceleration, or other physical factors of the environment 248 where the user 232 is located. The sensors 238 may further gather information about the user 232. Such information may include biometric information, such as pulse rate or respiratory rate, skin conductivity, pupil dilation, haptic information about one or more touches of the user 232, and so forth. Thus, the sensors 238 may include or be part of a wearable device such as a watch, belt or harness. Further, such user data may include information about the position, posture and movement of the user 232. In some embodiments, the sensors 238 merely sense a condition and report information. In some embodiments, the sensors 238 detect an attentiveness level or distraction level of the user 232 as the user experiences content items presented to the user 232 by the display system 236, the XR headset 234 or a combination of these. In other embodiments, one or more of the sensors 238 may be controllable, such as by the user computer 242.

The camera 240 may include one or more cameras that collect images of the user 232 and the physical environment 248 near the user 232. For example, the camera 240 may be controlled by the user computer 242 or another device to collect images of the environment 248 to identify objects and individuals in the environment 248. Images from the camera 240 may be used to develop an inventory or map of the environment for use by the user computer 242 or the server 244. In some embodiments, the camera 240 may detect information about an attentiveness level or distraction level of the user 232. The camera 240 may collect visual images, infra-red images and others. The camera 240 may include one or more cameras including, for example, a camera that is part of the XR headset 234. The camera 240 may also collect images in various formats such as color (RGB) pixels, depth maps (three-dimensional sensing from time-of-flight sensing or another algorithm), or thermal heatmaps, using infrared or other sensor designs.

The mobile device 250 may include a cellular telephone, a smart phone, a tablet computer or other portable device of the user 232. Content items, including summary segments related to content items, may be presented to the user 232 via the mobile device 250. Presentation of such content items may be changed automatically or under control of the user 232 between the display device 236 and the mobile device 250. For example, the user 232 may view a portion of a content item on the display device 236 at the home of the user, switch viewing of the content item to the mobile device 250 while travelling, and switch again to another display device when returning to the environment 248 or arriving at another environment. Each time the user's consumption of a content item is interrupted or switched between the mobile device 250 and the display device 236, a summary segment may be presented to the user 232 to reorient the user 232 to the content item. Presentation of the summary segment may be based on the context of the user 232, including a location of the user, activities of the user 232, level of engagement or distraction by the user 232, etc. The level of engagement of the user, or the level of distraction of the user may be quantified in any suitable manner, such as an amount of time, or a time duration for the user to become distracted. The quantified level may be compared with a threshold amount, such as 5 minutes or 10 minutes.

The user computer 242 in the illustrated embodiment is in data communication with the XR headset 234, the display system 236, the sensors 238, the camera 240 and the mobile device 250. In the illustrated embodiment, the user computer 232 has wireline connections to the XR headset 234, the sensors 238 and the camera 240. In other embodiments, the wireline connections may be supplemented or replaced with one or more wireless connections, such as a WiFi connection according to the IEEE 802.11 family of standards or a Bluetooth connection according to the Bluetooth standard.

The user computer 242 cooperates with the XR headset 234, the display system 236 and the mobile device 250 to provide video and audio content for the user 232. The user computer 212 communicates with the XR headset 234 to provide video information, audio information and other control information to the XR headset 234 and to coordinate video, audio and multimedia presentations between the display system 236, the XR headset 234 and the mobile device 250. The user computer 242 communicates with the sensors 238 to collect information about the physical environment 248 and the user 232. The user computer 242 communicates with the server 244 to provide video and other information from the XR headset 234, display system 236 and mobile device 250 to the server 244 and to provide information and data from the sensors 238 to the server 244. The video and data may be sent in any suitable format, including encoding to reduce the amount of data transmitted or encrypted to maintain security of the data. The user computer 242 communicates to the XR headset 234, the display system 236 and the mobile device 250 video information which may be two-dimensional (2D) video or three-dimensional (3D) video. The user computer 242 communicates virtual reality information to the XR headset 234. The user computer 242 coordinates video, XR video, audio and multimedia information presented to the user by the XR headset 234 with video, audio and other information presented to the user by the display system 236 and the mobile device 250.

In some embodiments, the functionality provided by the user computer 242 may be combined with the XR headset 234, the display system 236 and the mobile device 250. In the embodiment of FIG. 2B, the user computer 242 is shown as a laptop computer. However, any suitable processing system, including one or more processors, memory and communications interface, may implement the functions of the user computer 242.

The server 244 in some embodiments controls provision of content items including summary segments to the XR headset 234, the display system 236 and the mobile device 250 for the user 232. The server 244 generally includes a processing system including one or more processors, a memory for storing data and instructions and a communications interface. The server 244 may be implemented as a single server computer, as multiple server computers at one or multiple locations or in any suitable manner. In the system 230, the server 244 implements a content engine 252.

The server 244 receives over the communications network 246 information about the environment 248 of the user 232, including location information, information about objects and people in the environment 248 and events occurring in the environment 248. The server 244 in some embodiments may further receive information about the user 232 including biometric information and information about the performance of the user 232. The information may come from the sensors 238, the XR headset 234, or any other source. Under control of the content engine 252, the server 244 provides control information over the communications network 246 including video information, audio information, haptic information and any other information, including instructions and data, to the other components of the system 230 including the user computer 242, the XR headset 234, the display system 236 and the mobile device 250.

The communications network 246 may include any combination of wireline and wireless communication networks, including but not limited to broadband access 110, wireless access 120, voice access 130 and media access 140 (FIG. 1). The communications network 246 may include the internet and may provide access to other devices and services as well.

Conventional systems are known to provide a segment at the beginning of a content item including video or audio displayed in previous content items such as previous episodes of a television program. Such segments are static and prerecorded and are typically prepended to currently-viewed segment. Such segments may be introduced by text or audio announcing "last seen on . . . " or "as previously seen . . . ." Such segments are intended for a general audience and are not specific to any viewer, including the user 232.

In contrast, a system in accordance with the various aspects described herein is active in nature in that such a system tailors a summary segment for the user 232 to the particular context of the user 232. Such context may include the past experience of the user 232 with viewing a content item or other related content items such as previous episodes. Such context may include the environment 248 where the user 232 is located, including other users present with the user 232 in the environment 248. The system 230 can then develop a summary segment based on the context of the user 232 for presentation to the user 232. The summary segment may include video, audio and immersive experiences. Such a summary segment may supplement a video content item, an audio content item or a gaming content item, or other content items presented to the user 232.

In some embodiments, the system 230 has awareness of the contents of the environment 248 including other persons present in the environment 248. In some embodiments, the system 230 may identify one or more of the other persons in the environment. This may be done, for example, using information collected about the persons including the user 232 by the sensors 238 and the camera 240, such as using facial recognition on images of the persons in the environment 248. The system 230 may have access to information about experience of persons including the user 232 with a content item being presented to the user 232 in the environment 248. For example, the system 230 may retrieve user profile information from a data source based on the identification of the persons including the user 232. The user profile information may contain information about experience of the persons including the user 232 with the content item. The system 230 may prepare a summary segment using such information.

Figure 2C:
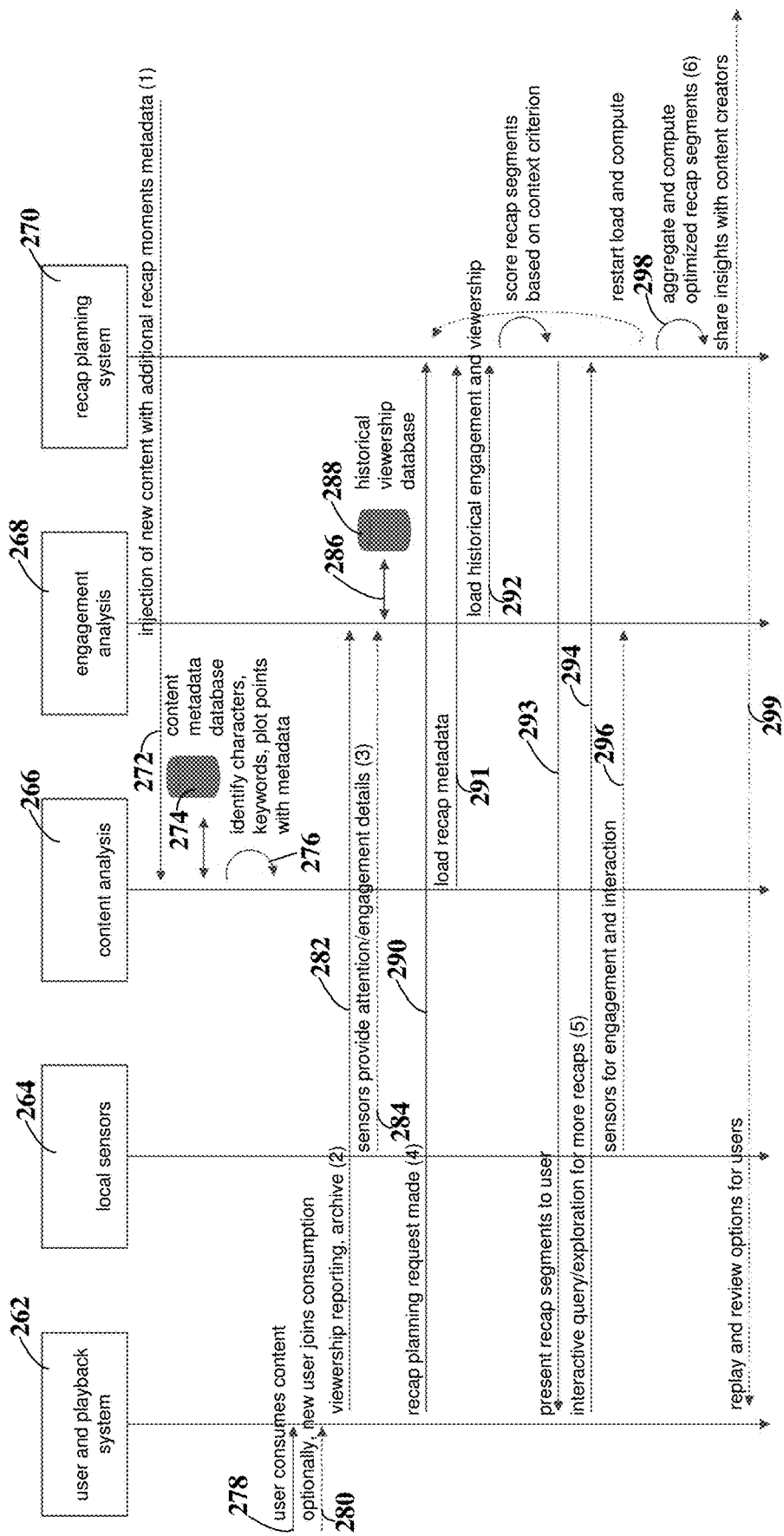
FIG. 2C depicts an illustrative embodiment of a method for providing summary segments in accordance with various aspects described herein.

FIG. 2C depicts an illustrative embodiment of a method 260 in accordance with various aspects described herein. The method 260 provides one or more summary segments to a user such as the user 232 in FIG. 2B. The summary segments may provide content including video, audio, game portions and immersive experiences to inform or orient the user about other portions of a content item of interest, such as previous episodes of an entertainment franchise where the content item of interest is a current episode or an episode to be presented to the user.

The method 260 may be performed by any suitable equipment or devices. In the embodiment of FIG. 2C, a user engages with a playback system 262 and local sensors 264 interact with a content analysis module 266, an engagement analysis module 268 and a recap planning system 270. For example, the system 262 and local sensors 264 may be located in the same environment with the user, such as in the same room in a home or office. The playback system 262 may include any device or apparatus or combination for providing content and summary segments to the user. Examples of the playback system include a television or smart television, a set-top box (STB) and a residential gateway connected to a network such as a cable television network or satellite television network. Other examples of the playback system 262 include a gaming arrangement that may be connected to a network such as the internet for online or local gaming and may include equipment such as a headset, game box controller and other devices. Other examples of the playback system 262 include portable or mobile devices for receipt and presentation of content items including video, audio and gaming, to the user. Examples include smart phones, tablet computers and other devices that may be transported by the user.

Some embodiments of the method 260 include information from sensors 264. The sensors 264 may be locally positioned with the user such as in the same room. The sensors 264 may further be part of the playback system 262, such as a camera mounted on a television system to observe user engagement with a content item or a camera or microphone of a smartphone to capture information about the user and his environment during content consumption.

The content analysis module 266, the engagement analysis module 268 and the recap planning system 270 may be located in any suitable location. In the embodiment of system 230 (FIG. 2B), the content analysis module 266, the engagement analysis module 268 and the recap planning system 270 may be located at the server 244 and interact with user equipment over the communications network 246. In other embodiments, if the playback system 262 has sufficient computational resources, the content analysis module 266, the engagement analysis module 268 and the recap planning system 270 may be located as part of the playback system, such as part of a residential gateway or STB. The content analysis module 266, the engagement analysis module 268 and the recap planning system 270 may be implemented by one or more processors operating in response to data and instructions stored in memory or received from other elements over a communications network.

The method 260 in the illustrated embodiment begins at step 272 with injection of a new content item with additional summary moments metadata. In this example, it is assumed that the method receives preexisting summary moments data, such as a file or video clip curated by a human such as an editor and intended to be located at the beginning of an episode or content portion as a "previously on" segment, or a "last seen" segment. Such preexisting summary moments data is typically static and intended to be displayed to the user at a time immediately before viewing a particular segment. Such preexisting summary moments are not required by the method 260 but may be used if available as a source of information about a content item but may be used for example as a starting point to drive the method 260. Implicit in such a preexisting summary moment is an acknowledgment that the preexisting summary moment includes information that is pertinent to the characters and plot (if the content item is fictional or a game) or other aspects of the content item. The preexisting content item may operate to seed the analysis.

The preexisting summary moment may be received as metadata or in any suitable format by the content analysis module 266. The preexisting summary moment may be obtained from any suitable source, such as a producer of the content item of interest. The content analysis module 266 operates in conjunction with a content metadata database 274 to analyze the content item of interest at step 276. As indicated in the drawing figure, such analysis may include identifying characters, keywords in either spoken audio or text, plot points and other aspects of the content item. This may be done, for example, by image recognition or facial recognition of images in the video content. In one example, analyzing the content item of interest may include identifying respective segments of the content item of interest, such as the segments 204 of content item 202 (FIG. 2A). In examples, where the content item of interest is an audio portion, analyzing the content item of interest may include audio recognition. The content metadata database 274 may store any useful information necessary to completion of step 276, such as information about past episodes in the case of a television program or film or past game action and a current game status in the case where the content item of interest is a video game. Other information to be analyzed and determined including location, people recognition such as by facial recognition of video images, scene segmentation, sentiment, etc. This information can be determined for multiple episodes of an entertainment franchise, the entirety of an entertainment franchise and outside or external information as well. This information can provide a richer understanding of the particular episode, its plot and characters in the case of a fictional item for example. This analysis may not be perfect or a full analysis of the content that is available. However, the analysis forms seeds that begin to recall or splice in other content to be used in preparing summary segment.

Other information may be part of the analysis of step 276. For example, the analysis may be based in part on metadata related to the playback time or air time of the content item of interest. This may include a time of day, current world events, relevant keywords, current headlines in news, sports and entertainment, as examples. In some examples, the metadata used for step 276 can use associated complexity of the content as a metadata feature. Examples would include educational material that is foundational to the content item of interest or even educational or background material that is ancillary to the content item of interest. Further, some embodiments, step 276 may include linking across multiple episodes of the entertainment franchise. Where the content item of interest is an XR game, step 276 may include incorporation of aspects of an immersive experience previously created and enjoyed by the user, including features such as location, characters present and features of the game that have been experienced by the user.

The operation of step 276 may be done offline, prior to viewing or selection of the content item of interest by the user, using available information from the content metadata database 274 and other sources. In some examples, the analysis of step 276 may be done in real time in preparation for presenting an episode to the user.

At step 278, the user begins consuming the content item of interest. This may include, for example, watching a new episode of a television program or film; listening to a new song on an album; listening to a new episode of a podcast; playing a new session of a game; initiating a new XR immersive experience; or any other suitable content consumption by the user. In order to consume the content at step 228, the user engages the playback system 262. This may include initiating playback of a program on television, initiating a game or XR immersive experience, playing a song, etc.

In an embodiment including an optional step 280, a new user joins the consumption of the content item of interest. The method 260 may include different modes. In a first mode, a user has some familiarity with the content item of interest, such as past experience viewing earlier episodes. In a second mode, the user or a new user has no experience with the content item of interest. Where a new user joins the presentation of the content item of interest, the method 260 may modulate its performance. The method 260 will provide a more complete summary segment to the new user. For the user who has more experience with the entertainment franchise, the method 260 will provide a more tailored summary segment. The context of the summary segment includes each user's relative level of experience with the content item of interest and related material.

At step 282, the method 260 records information about viewership by the user and at the playback system 262, of the content item of interest and other content. For current consumption of content, at step 282, the engagement analysis module 268 receives information about current viewership form the playback system 262. This information may include, for example, the duration of content viewing or consumption, the environment or other context information. Other user data may be collected by the engagement analysis module 268 that may be pertinent to understanding the user's engagement with the content item of interest. Such user data may include information about the user's subscription to one or more content sources including content items or other assets viewed or purchased or downloaded by the user. Such information may be contained in a profile associated with the user that may be retrieved or accessed by the engagement analysis module 268. This permits the engagement analysis module 268 to understand the user's familiarity with the content item of interest.

If local sensors 264 are available to provide additional context, sensor information may be collected at step 284 by the engagement analysis module 268. Such sensors may include one or more cameras. For example, a camera may show the user's face or other body part to indicate the user's level of engagement with the content item of interest, which may be quantified in any suitable manner and, for example, compared with a threshold. Such sensors may include one or more audio sensors such as microphones to capture information such as ambient sound level. If there was too much noise in a listening environment, the engagement analysis module 268 may determine the user was not closely engaged. Such sensors may include sensors to capture biometric information, such as the user's heart or respiration rate to indicate user involvement with, engagement with or response to the content item of interest. If playback device 262 includes a device such as a mobile phone with an accelerometer or motion sensor, the engagement analysis module 268 may receive at step 284 motion information from the accelerometer or motion sensor about user engagement while consuming content on the mobile phone. The motion information may indicate the user was jogging while listening to a podcast episode and therefore not fully engaged. Similarly, if the playback device 262 includes an XR headset such as XR headset 234 equipped with a motion sensor or other sensor, the engagement analysis module 268 may receive at step 284 motion information about the activities of the content consumer wearing the XR headset. This may include or be interpreted as information about the engagement by the content consumer with an immersive experience forming the content item of interest. Still further, if the XR headset includes a sensor to track a focal point of the wearer's vision, to monitor the spot at which the viewer gazes, the engagement analysis module 268 may monitor sensor information about the viewer's gaze to determine the content consumer's involvement with the immersive experience.

The sensor information received at step 284 may be used by the engagement analysis module 268 to determine temporary or long-term engagement by the user with the content item of interest. This may be done in any suitable fashion, such as quantifying the user's interest level or level of distractibility, and comparing with a suitable threshold. This in turn may trigger a summary segment summary, such as in response to an interruption such as a pause in playback, for example. Optionally, in response to determining a low level of engagement by the user in a portion of the content item of interest, e.g., in relation to a pre-established threshold, the engagement analysis module 268 may down-weight future sections of the content item of interest for including or excluding those future sections in a summary segment. For example, if the engagement analysis module 268 determines the user has not been engaged with content playback of a particular portion the content item of interest, the engagement analysis module 268 may conclude that the particular portion of the content item of interest should be included in a future summary segment to reorient the user when engagement resumes.

At step 286, the engagement analysis module 268 stores engagement information about user engagement with the content item of interest in a historical viewership database 288. The historical viewership database 288 may also store information about past episodes and segments of content the viewer has consumed. The historical viewership database 288 maintains information about content the user has consumed, along with a relative level of engagement with the content consumed. If other viewers are present with the user, similar information about the other users may be retrieved and stored in the historical viewership database 288.

Initiation of preparation of a summary segment may be done in any suitable fashion. A summary segment may be prepared automatically in response to determining user inattention as detected by the local sensors 264. A summary segment may be prepared automatically in response to determining user confusion, based for example on a look of confusion on the user's face. A summary segment may be prepared automatically in response to detecting an interruption in user playback, such as the user leaving the room where the television is located. A summary segment may be prepared automatically in response to detecting an interruption in user playback such as switching playback from one device, such as a television at home, to another device such as a mobile device. For example, the engagement analysis module 268 may conclude that a summary segment is required to reorient the user to the current scene or character or action in a game or immersive experience. The summary segment may be prepared to reorient the user when playback is resumed.

A summary segment may also be prepared as part of an interactive process with the user. At step 290, a summary planning request is received at the recap planning system 270. The user may conclude that the user does not know enough about a character or a plot point or a game situation and request a summary segment to orient the user. The request may be received by the recap planning system 270 in any suitable fashion, such as by the user accessing an on-screen menu system and creating the request.

In response to the request, or a determination that a summary segment should be prepared, at step 291, summary metadata is acquired by the recap planning system 270. The summary metadata may be obtained from the content metadata database 274 or from the ongoing content analysis being performed by the content analysis module 266. At step 292, information about the user's historical engagement and viewership of the content item of interest and related content, such as other episodes of the franchise, as acquired by the recap planning system 270. Such information may come, for example, from the historical viewership database 288.

The recap planning system 270 uses relevant information including a local history of user engagement and a long-term history of user content consumption to pool all potential summary segments that provide information gain for the content item of interest given the current context. The recap planning system 270 uses available information to develop a suitable summary segment or recap segment for playback to the user. For example, the local history of user engagement may include information received at step 282 and information stored in the historical viewership database 288. The long-term history of user consumption may further include information stored in the historical viewership database 288 and in other sources such as a user profile. The current context may pertain to a character of interest, a plot point of interest, etc.

The recap planning system 270 retrieves information from the content analysis module, step 291. The recap planning system 270 further retrieves information from the historical viewership database 288, step 292. The recap planning system 270 further determines or retrieves information about the user's current context. For example, the current context includes information about who else is present in the environment with the user, what the user is currently doing, how much time the user has to consume the summary segment, etc.

Further, the recap planning system 270 operates to score and sort summary segments. Scoring the summary segments can be based on various factors. One factor for scoring a summary segment is the time budget for the summary segment. A time budget is the amount of time or duration limit for a summary segment. A summary segment with a too long duration may not be useful to the user. A summary segment that is too short may fail to reorient the user to the content of interest. If the user is alone, more time may be allotted to a summary because there may be less risk of intruding on a group. If a user is commuting and will view the summary segment on a mobile device, the time budget may be less because of possible distractions or changes in the user's environment. For example, when viewing on a mobile device, the duration of the summary segment to be viewed on the mobile device may be limited to no more than one minute in all cases. In another example, the duration of the summary segment may be selected based on historical viewing habits of the user. Information about historical viewing habits may be obtained, for example, from the historical viewership database 288.

A second factor for scoring a summary segment is on a character or a story line. The recap planning system 270 operates to determine information such as the influence of a character or plot line in the user's current context. Based on that, the recap planning system 270 determines how much of each episode or other information needs to be reviewed in a summary segment. Based on this information, the recap planning system 270 assembles one or more summary segments for the viewer.

A third factor for scoring a summary segment includes external social references. Such social references may come from social media of the user including postings online that the user has made or has read, if the recap planning system 270 has access to those. Such access may be available through a user profile of the user.

In the embodiment of FIG. 2C, operation of the recap planning system 270 is illustrated with multiple loops as operation may be iterative. In one aspect, the recap planning system 270 may iterate internally to identify appropriate cut and start points for content clips that form the summary segment to provide the right segment with the right content for the user with the user's context. In another aspect, the recap planning system 270 may iterate in conjunction with the user by offering a summary segment to a user and having the user decline all or a portion of the summary segment. The user may decline because the user's understanding of the content is more complete than estimated by the recap planning system 270.

At step 293, one or more summary segments are provided to the user. Presentation may be in any suitable manner, including with user controls for fast forward, rewind, play again and pause or stop action controls. The summary segments are presented to the user according to the playback system 262 the user is engaged with, such as a mobile device or gaming system.

The method 260 may include presenting a menu system to the user to control other aspects of presentation of the summary segment. For example, at step 294, the user may interactively specify a query requesting, for example, more details about a character or a plot point. The query may ask the recap planning system 270 for more details about some aspect of the summary segment. In response to the query, the recap planning system 270 may repeat some or all of its earlier processing to develop one or more summary segments responsive to the user's query, to sort the summary segments and return a complete segment to the user, step 298.

In one example, the recap planning system 270 may receive information from the local sensors at step 296. The information from the local sensors may be used to determine user engagement. For example, if the recap planning system 270 begins playing a video summary segment to the user at the playback system 262 but a camera or other sensor determines that the user is bored or uninterested in the playback of the summary segment, the recap planning system 270 can suspend playback of the summary segment.

In an embodiment, in step 298, after the presentation of the summary segment to the user and iteration with the user, the recap planning system 270 can aggregate segments that have been assembled or collected and shared externally. Potential summary segments may be shared for viewers who may be able to reuse the clip. Multiple summary segments may be aggregated for abridgement, informed by behavior and engagement. Alternatively, the multiple summary segments may be abridged based on other factors, such as user demographics or other factors to provide better non-personalized last-on assets. For example, summary segments could be abridged to form the best abridgment for use while the user is running, or the best abridgment for use while the user is commuting.

In another example, the summary planning system may replay and review summary segments from the most immediate playback. This may be useful while the user is viewing a live asset but stepped away from the television or other playback system for a few minutes.

In another example; the clips or other summary segment information may be shared with the content creators. The information may be used during preparation of future content to identify where users found the need for additional clarification. At step 299, the summary clip may be sent to the user for replay and review by the user. The user may desire to see the summary clip again or to share it with others, such as on social media, for example.

A system and method in accordance with aspects described herein provides a variety of user benefits. First, the system and method provide customized summary segments to each user. The summary segment is provided based on knowledge of each individual user, such as other content consumed by the user, a level of distraction or engagement by the user, etc., however quantified and measured. Moreover, the system and method can accommodate multiple users consuming content together, but having different experiences with the content. The summary segment may be prepared to include enough information to reorient all viewers adequately but without boring or overwhelming or spoiling the experience for any one viewer. A summary segment can be tailored for a group including novice content consumers and expert content consumers. Further, with use of sensors, cameras and other technology, feedback can be collected from the user to determine the user's level of understanding of the plot and characters of a fictional content item or similar aspects of an immersive experience. This information can be used to tailor the content of a summary segment. Further, this information can be used to inform creators of the content item to help them understand which parts of the content are more engaging and which are less engaging. In this way, for example, a game can be improved to be more engaging for future players, especially if similar information is collected for a substantial sample size of players.

In another aspect, the method and system are useful to more naturally include and engage new viewers to a series of episodes. For example, the system and method can provide for automatic selection of appropriate summary moments from previous episodes or seasons of a content item for a viewer just coming to the current episode or season. The summary segment can provide the necessary background to understand the current action in a fictional item, an XR immersion or a game. Further, for mobile viewers who only have limited time to watch or consume content, the system and method may provide a better, more informative collection of summary information to help the viewer resume consumption. For example, if the user is only able to consume 5-10 minutes of a content item at a time while on the go, the method may be applied over a shorter time duration. Rather than provide a summary of the last three seasons of a television program, portions of just the last few episodes may be used to prepare the summary segment. The shortened time frame available for viewing may be matched with a shortened time frame recapping.

In other examples, the system and method may collect information to understand a broader context and historical viewing of the user, and use that information for preparing summary segments. For example, in addition to linking specific characters, specific narratives or story line context may be linked to other content features as well. For example, the Star Wars franchise of films may be contextually linked to Viking mythology and to NASA space travel, and the user's understanding and knowledge of each may be explored and used in preparing summary segments. This process may be performed around a specific actor or character, or around a specific place being discussed or a specific event.

In another example, the system and method may be applied to education and learning environments. A number of definitions, video components and audio components that relate to a specific topic may be used to create study or training materials that are specific to each user or learner, based on what each user or learner has historically consumed. For example, for a course offered online, such as a massive open online course (MOOC), learners often are engaged with learning course material and then are away from the material for a time. During the away times, the learner may lose the context or continuity of the course material. Upon returning, the learner may need a summary of the course material to be reoriented to the material. The system and method may identify for the individual learner what core concepts require a summary and in turn prepare and present one or more summary segments for the learner. This may be particularly useful in arrangements where one or more sensors monitor the learner's engagement with the material. Times or topics with less engagement should receive greater emphasis in the summary segment.

Another example provides for broader expansion and utilization of specific keywords to any historical asset. For example, a browser extension monitors content provided in a browser and identifies particular keywords of interest. Based on content analysis of other content items, links to conceptually related content items may be provided.

In another example, the system and method can monitor the user's level of engagement. This may be detected in any conventional form and quantified, such as according to a time duration or based on physical indicators of the user's attention such as eye movement, hand movement, etc. Once quantified, the level of engagement can be compared with any suitable threshold values. At times of low engagement, the system may prompt the user to take a break or vary a routine, for example, to improve focus on a project. After the enforced break, the user will be able to focus more on the task at hand. It can be determined that, over a sample of users, a particular moment is identified as a low-engagement moment. That low-engagement moment may be used to suggest a break from work or viewing the content item.

In another example, one or more summary segments may be provided to a second screen device of the user. For example, many viewers watch video content on a first screen such as a television. Meanwhile, the viewer has at hand a second screen such as a laptop or tablet computer or a mobile phone. The second screen device is used by the user for online searching or communication, such as by text or email, or other purposes simultaneously with consuming content on the first screen. In some applications, the system and method may provide the summary segment to the second screen of the user. Alternatively, if the user has a collection or library of summary segments, the user may display them or request them using the second screen.

In another example, the system and method monitors user engagement and attention across different devices when consuming a content item. As the user moves from device to device, the system and method may offer the user a summary segment on the new device to reorient the user to the content already seen. Because the system and method monitored the portions of content already seen as well as the attention levels of the user during consumption of those portions of content, the system and method may tailor the summary according to the attention level. Attention level may be measured and quantified in any conventional fashion. Portions of content during which the user was less attentive may be emphasized when selecting content to include in the summary segment.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 260 presented in FIGS. 1, 2A, 2B, 2C, and 3. For example, virtualized communication network 300 can facilitate in whole or in part providing a content item to a user of a content consumption device, determining information about consumption of the content item and other content by the user, preparing a summary segment for the user according to the user's consumption of content and the user's context, and providing the summary segment to the user at an appropriate time that is most useful for the user Such an appropriate time may not be at the beginning of playback of the content item.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
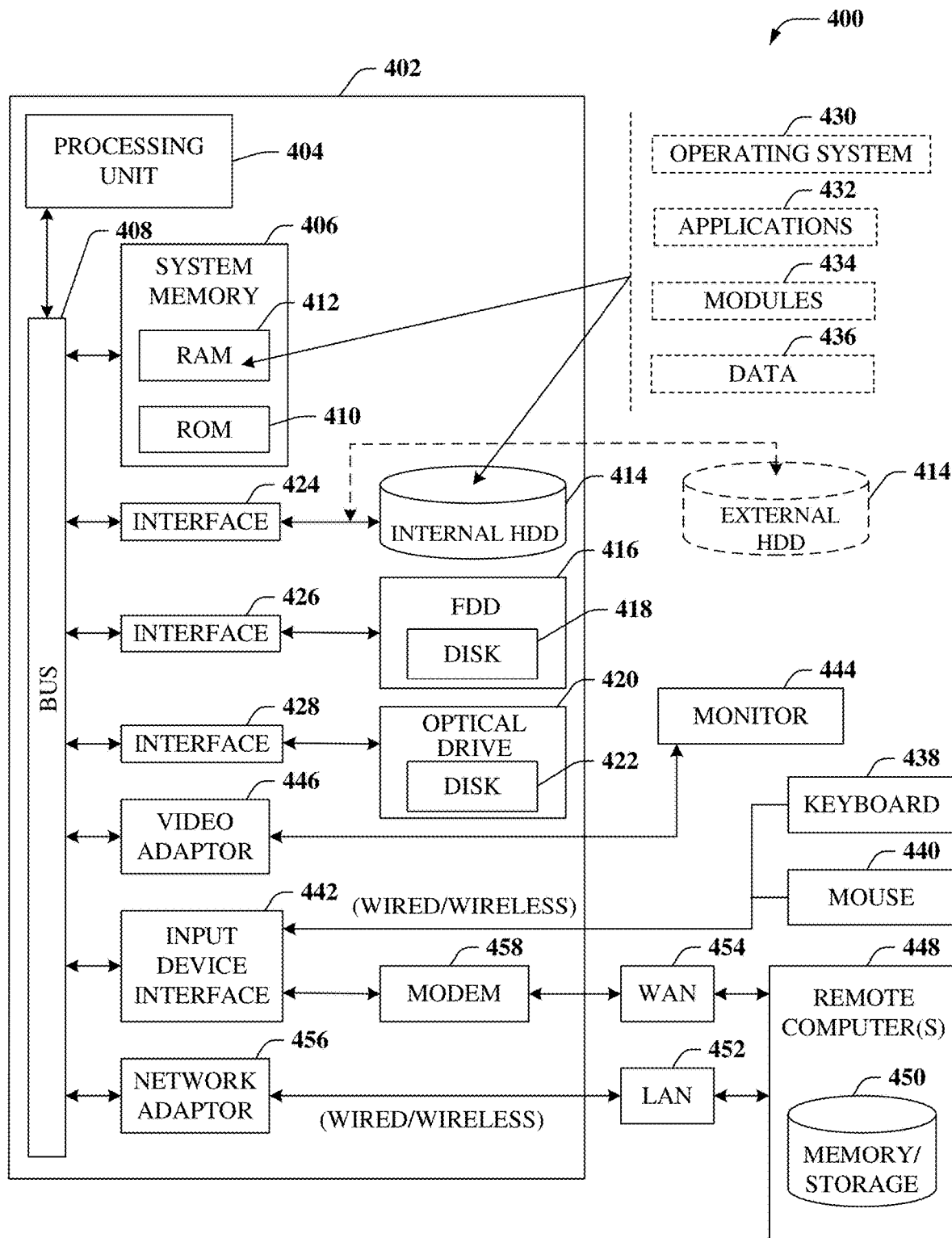
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part detecting consumption of a content item by a user, such as an immersive experience or a video content item, determining context information for the user and curating a summary segment for the content item. Curating a summary segment may include any steps or operations that are part of preparation and communication of the summary segment. These can include receiving the content item of interest, identifying information within the content item of interest, including plot lines, characters, segments of the content item, etc.; selecting portions of the content item of interest to include in a summary segment; selecting related content to include in a summary segment, including related content that has a different format such as video, audio, text or immersive; editing the summary segment to include selected elements, preparing the summary for communication of data forming the summary segment to the user, and the actual communication of the summary segment. The summary segment can assist the user in understanding what has occurred before in the content item and therefore orient the user to the current situation, such as a current plot or current state of a game.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
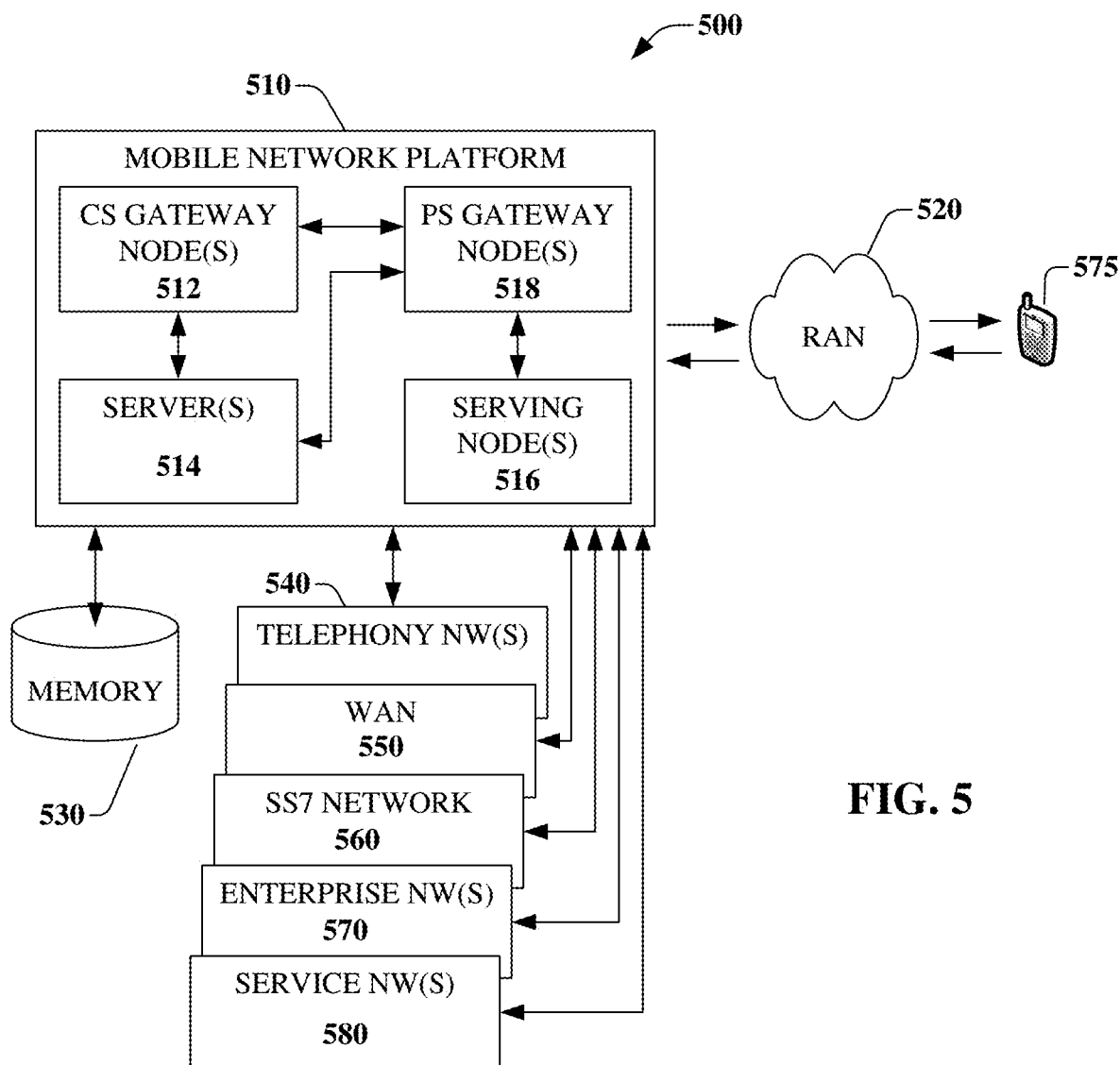
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing a content item to a user in an environment served by the mobile network platform, receiving from the user information about the user's consumption of the content item and the context of the user, and providing to the user a summary segment that recapitulates certain selected portions of the content item for the user. The recap segment can help reorient the user when the user rejoins the content item, such as after a time when the user was not engaged with the content item. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
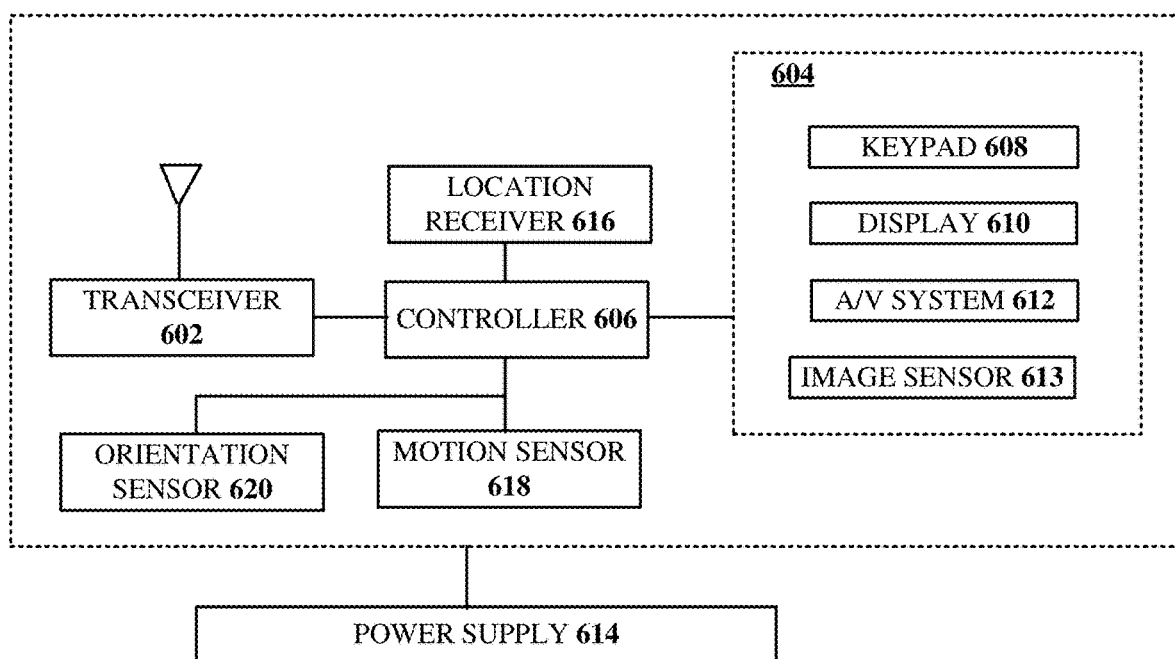
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part providing a content item of interest to a user, collecting information about context and consumption of the content item, and providing a summary segment to the user, where the summary segment is based on the content item and provides the user with information to help understand and reorient to the content, such as after an interruptions or a time of fading engagement by the user with the content item.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4 . . . xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory, machine-readable medium, comprising executable instructions that, when executed by a processing system including a processor, facilitate performance of operations, the operations comprising:
   receiving a content item of interest to a content consumer, the content item of interest including a sequence of segments of content, wherein a portion of the content item of interest was previously presented to the content consumer;
   determining information about consumption of the content item of interest by the content consumer;
   selecting one or more segments of the content item of interest for a summary segment to reorient the content consumer, wherein the selecting one or more segments of the content item of interest is based on the information about consumption of the content item of interest by the content consumer; and
   presenting the summary segment to the content consumer.

2. The non-transitory, machine-readable medium of claim 1, wherein the operations further comprise:
   receiving, from the content consumer, a request for additional summary segments for the content item of interest;
   formatting the additional summary segments according to the request; and
   presenting the additional summary segments to the content consumer.

3. The non-transitory, machine-readable medium of claim 1, wherein the determining information about consumption of the content item of interest by the content consumer comprises:
   determining other persons consuming the content item of interest with the content consumer;
   determining familiarity of the other persons with the content item of interest; and
   selecting the one or more segments of the content item of interest for the summary segment based on the familiarity of the other persons with the content item of interest.

4. The non-transitory, machine-readable medium of claim 1, wherein the receiving a content item of interest to a content consumer comprises:
   receiving one of a video content item, an audio content item, a gaming content item and an immersive experience content item.

5. The non-transitory, machine-readable medium of claim 1, wherein the operations further comprise:
   receiving sensor information about consumption of the content item of interest by the content consumer, wherein the receiving the sensor information comprises receiving information from one or more sensors in an environment with the content consumer as the content consumer consumes at least a portion of the content item of interest.

6. The non-transitory, machine-readable medium of claim 5, wherein the receiving sensor information comprises:
   receiving images from a camera; and
   receiving motion information from a device associated with the content consumer.

7. The non-transitory, machine-readable medium of claim 1, wherein the operations further comprise:
   determining a current level of engagement with the content item of interest; and
   providing the summary segment to the content consumer only when the current level of engagement with the content item of interest is determined to be higher than a predetermined threshold.

8. The non-transitory, machine-readable medium of claim 7, wherein the operations further comprise:
   identifying time periods of low engagement with the content item of interest during a previous presentation of the portion of the content item of interest to the content consumer; and
   selecting features of the content item of interest based on the time periods of low engagement by the content consumer.

9. The non-transitory, machine-readable medium of claim 1, wherein the operations further comprise:
   determining the content item of interest comprises a fictional content item;
   identifying, by the processing system, characters, keywords and plot points of the content item of interest, in response to the determining the content item of interest comprises a fictional content item; or
   determining the content item of interest comprises a video game; and
   identifying, by the processing system, past game action and a current game status in response to the determining the content item of interest comprises a video game.

10. A device, comprising:
   a processing system including a processor; and
   a memory that stores executable instructions that, when executed by the processing system, facilitate performance of operations, the operations comprising:
   receiving information about a content item of interest to a content consumer, the content item of interest including a sequence of segments of content, wherein a portion of the content item of interest was previously presented to the content consumer;
   determining a context of the content consumer;
   determining a level of engagement by the content consumer with the content item of interest;
   curating a summary segment for the content consumer based on the context of the content consumer, the summary segment comprising a plurality of segments of the sequence of segments of content, wherein the curating the summary segment comprises selecting one or more segments of the content item of interest based on the level of engagement by the content consumer; and presenting the summary segment to the content consumer to orient the content consumer to the content item of interest at a current viewing time of the content consumer.

11. The device of claim 10, wherein the operations further comprise:
receiving sensor information from one or more sensors associated with the content consumer; and
determining, based on the sensor information, the level of engagement by the content consumer with the content item of interest.

12. The device of claim 10, wherein the curating a summary segment for the content consumer comprises:
selecting auxiliary content to supplement or explain the content item of interest; and
including the auxiliary content in the summary segment.

13. The device of claim 12, wherein the selecting auxiliary content comprises selecting auxiliary content having a format different from a format of the content item of interest.

14. The device of claim 10, wherein the operations further comprise:
detecting a resumption in playback of the content item of interest to the content consumer following an interruption in the playback of the content item of interest; and
presenting the summary segment to the content consumer responsive to the detecting the resumption in playback of the content item of interest.

15. The device of claim 10, wherein the operations further comprise:
determining an engagement level of the content consumer during a previous presentation of the portion of the content item of interest to the content consumer;
identifying time periods of low engagement with the content item of interest; and
selecting one or more segments of the content item of interest based on the time periods of low engagement by the content consumer.

16. A method, comprising:
receiving, by a processing system including a processor, first information about a content item of interest to a content consumer, the content item of interest including a sequence of segments of content, wherein a portion of the content item of interest was previously presented to the content consumer;
analyzing, by the processing system, the first information about the content item of interest;
identifying, by the processing system, according to the analyzing, features of the content item of interest for playback to the content consumer, forming identified features of interest;
receiving, by the processing system, second information about consumption of the content item of interest by the content consumer;
preparing, by the processing system, a summary segment for the content item of interest, wherein the preparing the summary segment comprises selecting particular features from the identified features of interest based on the second information about consumption of the content item of interest by the content consumer to form the summary segment, the summary segment comprising a plurality of previously presented segments of the sequence of segments of content;
determining, by the processing system, a current context of the content consumer; and
providing, by the processing system, the summary segment to the content consumer according to the current context of the content consumer.

17. The method of claim 16, wherein the analyzing the first information about the content item of interest comprises:
determining, by the processing system, the content item of interest comprises a fictional content item;
identifying, by the processing system, characters, keywords and plot points of the content item of interest, in response to the determining the content item of interest comprises a fictional content item;
determining, by the processing system, the content item of interest comprises a video game; and
identifying, by the processing system, past game action and a current game status in response to the determining the content item of interest comprises a video game.

18. The method of claim 16, comprising:
determining, by the processing system, an engagement level of the content consumer during a previous presentation of the portion of the consumption of the content item of interest to the content consumer;
identifying, by the processing system, time periods of low engagement with the content item of interest; and
selecting features of the content item of interest for the summary segment based on the time periods of low engagement by the content consumer.

19. The method of claim 18, wherein the receiving a current context of the content consumer comprises:
receiving, by the processing system, information about a current environment of the content consumer for consuming the content item of interest.

20. The method of claim 19, wherein the determining the engagement level of the content consumer comprises:
receiving, by the processing system, from one or more sensors in the current environment of the content consumer, information about a current awareness level of the content consumer of the content item of interest; and
maintaining, by the processing system, in a historical viewership database, a historical record of awareness level of the content consumer of the content item of interest during the previous presentation of a portion of the content item of interest to the content consumer.

* * * * *